US012703792B2

(12) United States Patent
Ko et al.

(10) Patent No.: US 12,703,792 B2
(45) Date of Patent: Aug. 11, 2026

(54) COMPOSITE RESIN COMPOSITION FOR AUTOMOBILE INTERIOR MATERIALS AND AUTOMOBILE INTERIOR MATERIAL MANUFACTURED USING THE SAME

(71) Applicant: LG CHEM, LTD., Seoul (KR)

(72) Inventors: Gun Ko, Daejeon (KR); Seonho Kong, Daejeon (KR); Sun Mo Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 884 days.

(21) Appl. No.: 17/917,187

(22) PCT Filed: Feb. 25, 2022

(86) PCT No.: PCT/KR2022/002755

§ 371 (c)(1),
(2) Date: Oct. 5, 2022

(87) PCT Pub. No.: WO2022/239938

PCT Pub. Date: Nov. 17, 2022

(65) Prior Publication Data

US 2025/0002702 A1 Jan. 2, 2025

(30) Foreign Application Priority Data

May 10, 2021 (KR) ........................ 10-2021-0059760
Feb. 24, 2022 (KR) ........................ 10-2022-0024264

(51) Int. Cl.

| | |
|---|---|
| ***C08L 25/12*** | (2006.01) |
| ***B29B 9/12*** | (2006.01) |
| ***C08L 67/02*** | (2006.01) |
| *B29K 25/00* | (2006.01) |
| *B29K 67/00* | (2006.01) |
| *B29K 105/00* | (2006.01) |

(52) U.S. Cl.

CPC ................ *C08L 25/12* (2013.01); *B29B 9/12* (2013.01); *C08L 67/02* (2013.01); *B29K 2025/08* (2013.01); *B29K 2067/006* (2013.01); *B29K 2105/0088* (2013.01); *B29K 2105/0094* (2013.01); *B29K 2995/0016* (2013.01); *B29K 2995/0082* (2013.01); *B29K 2995/0089* (2013.01); *C08L 2205/025* (2013.01); *C08L 2205/035* (2013.01)

(58) Field of Classification Search

None
See application file for complete search history.

(56) References Cited

U.S. PATENT DOCUMENTS

2015/0376386 A1* 12/2015 Kim ........................ C08L 25/12 525/72
2018/0230304 A1* 8/2018 Nakamoto .............. C08L 63/00

FOREIGN PATENT DOCUMENTS

| | | | | |
|---|---|---|---|---|
| CN | 107001746 A | | 8/2017 | |
| EP | 0564241 | | 10/1993 | |
| EP | 0614945 | | 9/1994 | |
| KR | 10-2010-0122303 A | | 11/2010 | |
| KR | 10-2011-0054574 A | | 5/2011 | |
| KR | 10-2012-0075085 A | | 7/2012 | |
| KR | 1020120075085 | | 7/2012 | |
| KR | 10-2013-0078768 A | | 7/2013 | |
| KR | 10-14692630000 B1 | | 11/2014 | |
| KR | 20150078316 A | * | 7/2015 | ................ C08J 3/20 |
| KR | 1020150078316 | | 7/2015 | |
| KR | 1020150078316 A | | 7/2015 | |
| KR | 10-2017-0067318 A | | 6/2017 | |
| KR | 1020170067318 | | 6/2017 | |
| KR | 10-2018-0068566 A | | 6/2018 | |
| KR | 10-2018-0077438 A | | 7/2018 | |
| KR | 20180077438 A | * | 7/2018 | ............ C08F 279/04 |
| KR | 1020180077438 | | 7/2018 | |
| KR | 10-21305690000 B1 | | 6/2020 | |
| KR | 10-21734690000 B1 | | 10/2020 | |
| KR | 10-22179580000 B1 | | 2/2021 | |
| KR | 10-22352510000 B1 | | 3/2021 | |

* cited by examiner

*Primary Examiner* — Anthony J Frost
(74) *Attorney, Agent, or Firm* — BRYAN CAVE LEIGHTON PAISNER LLP

(57) ABSTRACT

A composite resin composition is described for automobile interior products and an automobile interior product manufactured using the same. More particularly, the composite resin composition for automobile interior products includes optimized materials, thereby providing improved heat resistance and chemical resistance. Accordingly, the composite resin composition for automobile interior products can satisfy the balance between physical properties such as mechanical properties, fluidity, and light resistance and provide excellent product reliability and appearance.

14 Claims, No Drawings

COMPOSITE RESIN COMPOSITION FOR AUTOMOBILE INTERIOR MATERIALS AND AUTOMOBILE INTERIOR MATERIAL MANUFACTURED USING THE SAME

CROSS-REFERENCE TO RELATED APPLICATIONS

The present application is a National Phase entry pursuant to 35 U.S.C. § 371 of International Application No. PCT/KR2022/002755 filed on Feb. 25, 2022, and claims priority to and the benefit of Korean Patent Application No. 10-2021-0059760, filed on May 10, 2021, and Korean Patent Application No. 10-2022-0024264, filed on Feb. 24, 2022, in the Korean Intellectual Property Office, the disclosures of each of which are incorporated herein by reference in their entirety.

FIELD

The present invention relates to a composite resin composition for automobile interior products and an automobile interior product manufactured using the same, and more particularly to a composite resin composition for automobile interior products, wherein raw materials included in the composite resin composition are optimized so that heat resistance and chemical resistance are improved, whereby the balance between physical properties such as mechanical properties, fluidity and light resistance is satisfied and excellent product reliability and appearance are provided; and an automobile interior product manufactured using the composite resin composition.

BACKGROUND

Conventional automobile interior product materials include an acrylonitrile-butadiene-styrene (ABS) resin, a composite resin prepared by mixing a polycarbonate (PC) resin with an acrylonitrile-butadiene-styrene (ABS) resin, a composite resin prepared by mixing a polycarbonate (PC) resin with acrylate-styrene-acrylonitrile (ASA) resin, a composite resin prepared by mixing a polycarbonate (PC) resin with a polyester resin, and the like. These materials have excellent physical properties, thus being used in various automobile interior components.

However, there are limitations in applying an acrylonitrile-butadiene-styrene resin (ABS) to electronic components or automobile interior products due to poor heat resistance thereof. In addition, when a polycarbonate resin (PC) is mixed with an acrylate-styrene-acrylonitrile resin (ASA), chemical resistance is weak due to the amorphous nature of the materials themselves, which causes cracks in materials that are frequently used in automobiles.

Therefore, it is necessary to develop a material for automobile interior products having improved heat resistance and chemical resistance, thereby being capable of satisfying the physical property balance between mechanical properties, light resistance, and the like.

Patent Document

Korean Patent Application Publication No. 2018-0068566 (published on Jun. 22, 2018)

SUMMARY

Therefore, the present invention has been made in view of the above problems, and it is one object of the present invention to provide a composite resin composition for automobile interior products, wherein the composite resin composition includes optimal materials so that production cost can be reduced and the composite resin composition can be used for an unpainted product, thereby providing superior economic feasibility. In addition, heat resistance and chemical resistance can be improved, the balance between physical properties such as mechanical properties, fluidity, and light resistance is satisfied, and excellent product reliability and appearance are provided.

It is another object of the present invention to provide an automobile interior product manufactured using the composite resin composition for automobile interior products.

The above and other objects can be accomplished by the present disclosure described below.

In accordance with an aspect of the present invention, the above and other objects can be accomplished by the provision of a composite resin composition, including: 15 to 20% by weight of a first vinyl cyanide compound-conjugated diene compound-aromatic vinyl compound copolymer; 9 to 15% by weight of a second vinyl cyanide compound-conjugated diene compound-aromatic vinyl compound copolymer; 32 to 40% by weight of an aromatic vinyl compound-vinyl cyanide compound copolymer; and 29 to 37% by weight of a polyester resin, wherein the amount (%) of the aromatic vinyl compound included in the first vinyl cyanide compound-conjugated diene compound-aromatic vinyl compound copolymer is smaller than the amount (%) of the aromatic vinyl compound included in the second vinyl cyanide compound-conjugated diene compound-aromatic vinyl compound copolymer.

A weight ratio of the second vinyl cyanide compound-conjugated diene compound-aromatic vinyl compound copolymer to the first vinyl cyanide compound-conjugated diene compound-aromatic vinyl compound copolymer may be 1:1.37 to 1.66.

The polyester resin may be one or more selected from among polybutylene terephthalate (PBT), polyethylene adipate (PEA), polybutylene succinate (PBS), polyethylene terephthalate (PET), polytrimethylene terephthalate (PTT) and polyethylene naphthalate (PEN).

The composite resin composition may have an L* value of 14.00 or less that is obtained by measuring light, reflected by a specimen obtained in an SCE manner, using an LAB colorimetric system.

The first vinyl cyanide compound-conjugated diene compound-aromatic vinyl compound copolymer may include 40 to 80% by weight of a diene rubber polymer having an average particle size of 100 to 500 nm, 10 to 40% by weight of an aromatic vinyl compound and 1 to 20% by weight of a vinyl cyanide compound.

The second vinyl cyanide compound-conjugated diene compound-aromatic vinyl compound copolymer may include 5 to 20% by weight of a diene rubber polymer having an average particle size of 800 to 10,000 nm, 50 to 85% by weight of an aromatic vinyl compound and 10 to 30% by weight of a vinyl cyanide compound.

The aromatic vinyl compound-vinyl cyanide compound copolymer may include 71 to 72% by weight of an aromatic vinyl compound and 28 to 29% by weight of a vinyl cyanide compound and has a weight average molecular weight of 130,000 to 180,000 g/mol.

The vinyl cyanide compound included in the aromatic vinyl compound-vinyl cyanide compound copolymer may be included in an amount of 26% by weight or more based on a total weight of the copolymer.

The polyester resin may have an intrinsic viscosity of 1.05 dl/g or more.

The composite resin composition may have a flow index of 25 g/10 min or more that is measured at 250° C. under a load of 5 kg according to ISO 1133.

The composite resin composition may have an Izod impact strength of 14 kJ/$m^2$ or more that is measured at 23° C. according to ISO 180/1A.

A ⅛ inch specimen manufactured using the composite resin composition may have a flexural modulus of 1950 MPa or more that is measured at a speed of 2 mm/min according to ISO 178.

The composite resin composition may have a high-load heat resistance of 75° C. or more that is measured under 1.82 MPa according to ISO 75.

In accordance with another aspect of the present invention, there is provided a composite resin composition, including:

15 to 20% by weight of a first vinyl cyanide compound-conjugated diene compound-aromatic vinyl compound copolymer; 9 to 15% by weight of a second vinyl cyanide compound-conjugated diene compound-aromatic vinyl compound copolymer; 32 to 40% by weight of an aromatic vinyl compound-vinyl cyanide compound copolymer; and 29 to 37% by weight of a polyester resin, wherein the amount (%) of the aromatic vinyl compound included in the first vinyl cyanide compound-conjugated diene compound-aromatic vinyl compound copolymer is smaller than the amount (%) of the aromatic vinyl compound included in the second vinyl cyanide compound-conjugated diene compound-aromatic vinyl compound copolymer, and the amount of the vinyl cyanide compound included in the aromatic vinyl compound-vinyl cyanide compound copolymer is 27 to 29% by weight based on a total weight of the copolymer, and the polyester resin has an intrinsic viscosity of 1.05 dl/g or more.

In accordance with another aspect of the present invention, there is provided a method of preparing a composite resin composition, the method including:

a step of feeding 15 to 20% by weight of a first vinyl cyanide compound-conjugated diene compound-aromatic vinyl compound copolymer; 9 to 15% by weight of a second vinyl cyanide compound-conjugated diene compound-aromatic vinyl compound copolymer; 32 to 40% by weight of an aromatic vinyl compound-vinyl cyanide compound copolymer; and 29 to 37% by weight of a polyester resin into an extruder, followed by melt-kneading and extruding, wherein the amount (%) of the aromatic vinyl compound included in the first vinyl cyanide compound-conjugated diene compound-aromatic vinyl compound copolymer is smaller than the amount (%) of the aromatic vinyl compound included in the second vinyl cyanide compound-conjugated diene compound-aromatic vinyl compound copolymer.

In accordance with another aspect of the present invention, there is provided a method of preparing a composite resin composition, the method including:

a step of feeding 15 to 20% by weight of a first vinyl cyanide compound-conjugated diene compound-aromatic vinyl compound copolymer; 9 to 15% by weight of a second vinyl cyanide compound-conjugated diene compound-aromatic vinyl compound copolymer; 32 to 40% by weight of an aromatic vinyl compound-vinyl cyanide compound copolymer; and 29 to 37% by weight of a polyester resin into an extruder, followed by melt-kneading and extruding, wherein the amount (%) of the aromatic vinyl compound included in the first vinyl cyanide compound-conjugated diene compound-aromatic vinyl compound copolymer is smaller than the amount (%) of the aromatic vinyl compound included in the second vinyl cyanide compound-conjugated diene compound-aromatic vinyl compound copolymer, and the amount of the vinyl cyanide compound included in the aromatic vinyl compound-vinyl cyanide compound copolymer is 27 to 29% by weight based on a total weight of the copolymer, and the polyester resin has an intrinsic viscosity of 1.05 dl/g or more.

In accordance with yet another aspect of the present invention, there is provided an automobile interior product manufactured using the composite resin composition.

The automobile interior product may be a floor console front tray or a cup holder.

A composite resin composition according to the present invention can be molded into an automobile interior product.

In addition, the automobile interior product has improved heat resistance and chemical resistance, thereby having excellent moldability while satisfying the balance between physical properties such as mechanical properties, fluidity, and light resistance. Accordingly, appearance is improved.

Therefore, the composite resin composition according to the present invention may be particularly applied to the field of automobile interior products including a floor console front tray and a cup holder.

DETAILED DESCRIPTION

Hereinafter, the present invention will be described in more detail to help the understanding of the present invention.

The terms or words used in the present specification and claims should not be construed as being limited to conventional or dictionary meanings, and considering that inventors can appropriately define the concept of a term to describe the invention in the best way, it should be interpreted as a meaning and concept consistent with the technical idea of the present invention.

In the present disclosure, "comprising" may be defined as "polymerized comprising" or "comprising as a unit derived . . . ," unless otherwise defined.

In the present disclosure, % by weight of a unit in a polymer, % by weight of a unit, or % by weight of a block may mean % by weight of a derived monomer.

In addition, in the present disclosure, % by weight of a unit in a polymer, % by weight of a unit, or % by weight of a block may be measured by a method generally used in the technical field to which the present invention pertains. As another method, on the premise that all monomers are polymerized, the amounts of added monomers may be defined as an amount such as a unit in a prepared polymer.

Unless otherwise specified, all numbers, values, and/or expressions expressing the quantities of ingredients, reaction conditions, polymer compositions and formulations used in the present disclosure are approximations reflecting various uncertainties due to measurements conducted to obtain the values from essentially different values. Accordingly, it should be understood as being modified by the term "about" in all cases. Also, when numerical ranges are disclosed in the present disclosure, such ranges are continuous and include all values from the minimum values to the maximum values of the ranges, unless otherwise indicated. Furthermore, when such ranges refer to integers, all integers including from the minimum value to the maximum value are included, unless otherwise specified.

In the present disclosure, when a variable is expressed as a range, it will be understood that the variable includes all values within the range including the endpoints of the range. For example, it will be understood that a range from "5 to 10" includes the values of 5,6,7,8,9 and 10, as well as any subranges from 6 to 10, 7 to 10, 6 to 9, 7 to 9, etc. Also, any values between integers that fall within the scope of the recited range such as 5.5 to 8.5, and 6.5 to 9, and the like. Also, it will be understood that a range from 10 to 30% include values of 10%, 11%, 12%, 13%, etc. and all integers including up to 30%, as well as any values between valid integers within the range of stated ranges such as 10.5%, 15.5%, 25.5%, etc.

The present inventors have confirmed that an interior product for automobiles prepared using a composite resin composition including a polyester resin, an emulsion-polymerized copolymer, an bulk-polymerized copolymer, and the like exhibits improved heat resistance and chemical resistance so that the balance between physical properties such as mechanical properties, fluidity, and light resistance is satisfied and excellent product reliability and appearance are provided. In addition, the present inventors have completed an interior product material for automobiles that has excellent moldability and appearance while satisfying the balance between physical properties such as mechanical properties, fluidity and light resistance and does not need to be painted.

Composite Resin Composition

A composite resin composition according to an embodiment of the present invention includes 15 to 20% by weight of a first vinyl cyanide compound-conjugated diene compound-aromatic vinyl compound copolymer; 9 to 15% by weight of a second vinyl cyanide compound-conjugated diene compound-aromatic vinyl compound copolymer; 32 to 40% by weight of an aromatic vinyl compound-vinyl cyanide compound copolymer; and 29 to 37% by weight of a polyester resin, wherein the amount (%) of the aromatic vinyl compound included in the first vinyl cyanide compound-conjugated diene compound-aromatic vinyl compound copolymer is smaller than the amount (%) of the aromatic vinyl compound included in the second vinyl cyanide compound-conjugated diene compound-aromatic vinyl compound copolymer. In this case, the composite resin composition according to an embodiment of the present invention may reduce production costs, compared to existing composite resins prepared by mixing a polycarbonate resin (PC) with acrylate-styrene-acrylonitrile (ASA). In addition, the composite resin composition may be used for unpainted products, thereby having superior economic feasibility. Further, the composite resin composition has improved heat resistance and chemical resistance, thereby satisfying the balance between physical properties such as mechanical properties, fluidity, and light resistance and realizing automobile interior products having excellent product reliability and appearance.

The polyester resin according to an embodiment of the present invention is a crystalline material, so that a composite resin composition including the polyester resin has moldability and an automobile interior product manufactured using the composite resin composition has chemical resistance.

The polyester resin may include, without being limited to, one or more selected from among polybutylene terephthalate (PBT), polyethylene adipate (PEA), polybutylene succinate (PBS) polyethylene terephthalate (PET), polytrimethylene terephthalate (PTT) and polyethylene naphthalate (PEN). As a particular example, polybutylene terephthalate (PBT) may be used. By using polybutylene terephthalate (PBT), the flowability of a composite resin composition is improved when injection-molded to have a crystallized structure while preventing the penetration of chemicals introduced from the outside, so that superior appearance is provided.

The intrinsic viscosity of the polyester resin may be, for example, 1.05 dl/g or more, 1.1 dl/g or more, or 1.1 to 1.3 dl/g. When the intrinsic viscosity is too low outside the range, the effect of reinforcing physical properties is decreased so that the effect of improving chemical resistance is insignificant. When the intrinsic viscosity is too high, moldability is decreased so that problems in the appearance of components may occur.

In the present disclosure, when intrinsic viscosity is measured, unless noted otherwise, a sample to be measured is completely dissolved in a methylene chloride solvent at a concentration of 0.05 g/ml, and then is filtered using a filter to obtain a filtrate. Then, using the obtained filtrate, intrinsic viscosity is measured at 20° C. using a Ubbelohde viscometer.

The amount of the polyester resin may be 29 to 37% by weight, particularly 33 to 37% by weight, based on 100% by weight of a total of the composite resin (the polyester resin+the first vinyl cyanide compound-conjugated diene compound-aromatic vinyl compound copolymer+the second vinyl cyanide compound-conjugated diene compound-aromatic vinyl compound copolymer+the aromatic vinyl compound-vinyl cyanide compound copolymer). When the polyester resin is included in an amount less than the range, an automobile interior product prepared using a composite resin composition including the polyester resin may be cracked. When the polyester resin is included in an amount greater than the range, the stiffness and heat resistance of an automobile interior product prepared using a composite resin composition including the polyester resin are decreased.

The styrene-based resin used in the present invention may be preferably composed of a ternary system prepared by mixing the first vinyl cyanide compound-conjugated diene compound-aromatic vinyl compound copolymer, the second vinyl cyanide compound-conjugated diene compound-aromatic vinyl compound copolymer, and the aromatic vinyl compound-vinyl cyanide compound copolymer. When the styrene-based resin is included together with the polyester resin described above, the chemical resistance of the composite resin composition including the same is greatly affected, and an automobile interior product manufactured using the composite resin composition exhibits improved chemical resistance.

In the present disclosure, "styrene-based resin" means a styrene-based resin commonly recognized in the technical field to which the present invention belongs and may mean, for example, a resin including an aromatic vinyl compound-derived unit.

In the present disclosure, the weight of the sum of the first vinyl cyanide compound-conjugated diene compound-aromatic vinyl compound copolymer and the second vinyl cyanide compound-conjugated diene compound-aromatic vinyl compound copolymer is smaller than the weight of the polyester resin. Thus, the deterioration of physical properties due to the polyester resin is mitigated, and an automobile interior product prepared using a composite resin composition including the first vinyl cyanide compound-conjugated diene compound-aromatic vinyl compound copolymer and the second vinyl cyanide compound-conjugated diene compound-aromatic vinyl compound copolymer exhibits improved impact resistance and mechanical properties.

In the present disclosure, when the weight of the sum of the first vinyl cyanide compound-conjugated diene compound-aromatic vinyl compound copolymer, the second vinyl cyanide compound-conjugated diene compound-aromatic vinyl compound copolymer and the aromatic vinyl compound-vinyl cyanide compound copolymer is larger than the weight of the polyester resin, flexural modulus and heat resistance are improved.

For example, preferably the amount of the sum of the first vinyl cyanide compound-conjugated diene compound-aromatic vinyl compound copolymer, the second vinyl cyanide compound-conjugated diene compound-aromatic vinyl compound copolymer and the aromatic vinyl compound-vinyl cyanide compound copolymer is particularly 145 to 209 parts by weight, more preferably 150 to 205 parts by weight, more preferably 160 to 205 parts by weight, most preferably 165 to 203 parts by weight, based on 100 parts by weight of the aforementioned polyester resin. Within these ranges, deterioration of physical properties due to the polyester resin are mitigated, and an automobile interior product prepared using a composite resin composition including the first vinyl cyanide compound-conjugated diene compound-aromatic vinyl compound copolymer, the second vinyl cyanide compound-conjugated diene compound-aromatic vinyl compound copolymer and the aromatic vinyl compound-vinyl cyanide compound copolymer exhibits improved impact resistance and mechanical properties.

A weight ratio of the second vinyl cyanide compound-conjugated diene compound-aromatic vinyl compound copolymer to the first vinyl cyanide compound-conjugated diene compound-aromatic vinyl compound copolymer may be, for example, 1:1.37 to 1.66, preferably 1:1.4 to 1.63. Within these ranges, deterioration of physical properties due to the polyester resin are mitigated, and an automobile interior product prepared using a composite resin composition including the second vinyl cyanide compound-conjugated diene compound-aromatic vinyl compound copolymer and the first vinyl cyanide compound-conjugated diene compound-aromatic vinyl compound copolymer exhibits improvement in mechanical properties such as impact resistance and flexural modulus, improved flow index, and improved heat resistance under a high load.

The first vinyl cyanide compound-conjugated diene compound-aromatic vinyl compound copolymer according to an embodiment of the present invention may include 40 to 80% by weight of a diene rubber polymer having an average particle size of 100 to 500 nm, 10 to 40% by weight of an aromatic vinyl compound and 1 to 20% by weight of a vinyl cyanide compound. Preferably, the first vinyl cyanide compound-conjugated diene compound-aromatic vinyl compound copolymer may be a graft copolymer prepared by emulsion-polymerizing 50 to 70% by weight of the diene rubber polymer, 20 to 35% by weight of the aromatic vinyl compound and 1 to 15% by weight of the vinyl cyanide compound, more preferably a graft copolymer prepared by emulsion-polymerizing 55 to 65% by weight of the conjugated diene compound, 25 to 35% by weight of the aromatic vinyl compound and 5 to 15% by weight of the vinyl cyanide compound. When the amount of the conjugated diene compound constituting the diene rubber polymer is below the range, impact resistance is decreased. On the other hand, when the amount of the conjugated diene compound constituting the diene rubber polymer it too high, stiffness (modulus of elasticity) is decreased. In addition, when the amount of the vinyl cyanide compound is too small, the effect of reinforcing rigidity is insignificant. On the other hand, when the amount of the vinyl cyanide compound is too high, impact resistance is decreased.

The conjugated diene compound included in the first vinyl cyanide compound-conjugated diene compound-aromatic vinyl compound copolymer may include, for example, butadiene, without being limited to a specific conjugated diene compound. In addition, the aromatic vinyl compound included in the first vinyl cyanide compound-conjugated diene compound-aromatic vinyl compound copolymer may be, for example, one or more selected from among styrene, a-methyl styrene, a-ethyl styrene and p-methyl styrene, preferably styrene. In addition, the vinyl cyanide compound included in the first vinyl cyanide compound-conjugated diene compound-aromatic vinyl compound copolymer may be, for example, one or more selected from among acrylonitrile and methacrylonitrile, preferably acrylonitrile.

The amount of the first vinyl cyanide compound-conjugated diene compound-aromatic vinyl compound copolymer may be 16 to 20% by weight, particularly 17 to 19% by weight, based on 100% by weight of a total of the composite resin composition (the polyester resin+the first vinyl cyanide compound-conjugated diene compound-aromatic vinyl compound copolymer+the second vinyl cyanide compound-conjugated diene compound-aromatic vinyl compound copolymer+the aromatic vinyl compound-vinyl cyanide compound copolymer). When the amount of the first vinyl cyanide compound-conjugated diene compound-aromatic vinyl compound copolymer is too low, an automobile interior product prepared using a composite resin composition including the first vinyl cyanide compound-conjugated diene compound-aromatic vinyl compound copolymer exhibits decreased impact resistance. On the other hand, the amount of the first vinyl cyanide compound-conjugated diene compound-aromatic vinyl compound copolymer is too high, an automobile interior product prepared using a composite resin composition including the copolymer exhibits decreased stiffness.

That is, since the composite resin composition according to an embodiment of the present invention includes 16 to 20% by weight of the first vinyl cyanide compound-conjugated diene compound-aromatic vinyl compound copolymer that is prepared by polymerizing the compounds in specific amounts, an automobile interior product manufactured using the composite resin composition exhibits balanced impact resistance, stiffness, heat resistance and chemical resistance.

The second vinyl cyanide compound-conjugated diene compound-aromatic vinyl compound copolymer according to an embodiment of the present invention may include 5 to 20% by weight of a diene rubber polymer having an average particle size of 800 to 10,000 nm, 50 to 85% by weight of an aromatic vinyl compound and 10 to 30% by weight of a vinyl cyanide compound. The second vinyl cyanide compound-conjugated diene compound-aromatic vinyl compound copolymer according to an embodiment of the present invention may be preferably a copolymer prepared by bulk-polymerizing 5 to 15% by weight of the diene rubber polymer, 57 to 75% by weight of the aromatic vinyl compound and 12 to 28% by weight of the vinyl cyanide compound, more preferably a copolymer prepared by bulk-polymerizing 10 to 15% by weight of the conjugated diene compound, 55 to 75% by weight of the aromatic vinyl compound and 15 to 25% by weight of the vinyl cyanide compound. When the amount of the conjugated diene compound constituting the diene rubber polymer is below the range, impact resistance is decreased. On the other hand, when the amount of the conjugated diene compound constituting the diene rubber polymer is too high, stiffness (modulus of elasticity) is decreased. In addition, when the amount of the vinyl cyanide compound is too small, the effect of reinforcing rigidity is insignificant. On the other hand, when the amount of the vinyl cyanide compound is too high, impact resistance is decreased.

The conjugated diene compound, aromatic vinyl compound, and vinyl cyanide compound included in the second vinyl cyanide compound-conjugated diene compound-aromatic vinyl compound copolymer may be the same as the conjugated diene compound, aromatic vinyl compound, and vinyl cyanide compound included in the first vinyl cyanide compound-conjugated diene compound-aromatic vinyl compound copolymer described above.

The amount of the second vinyl cyanide compound-conjugated diene compound-aromatic vinyl compound copolymer may be 10 to 14% by weight, particularly 11 to 13% by weight, based on 100% by weight of a total of the composite resin composition (the polyester resin+the first vinyl cyanide compound-conjugated diene compound-aromatic vinyl compound copolymer+the second vinyl cyanide compound-conjugated diene compound-aromatic vinyl compound copolymer+the aromatic vinyl compound-vinyl cyanide compound copolymer). When the amount of the second vinyl cyanide compound-conjugated diene compound-aromatic vinyl compound copolymer is too low, the appearance of an automobile interior product injection-molded using a composite resin composition including the second vinyl cyanide compound-conjugated diene compound-aromatic vinyl compound copolymer may be deteriorated. On the other hand, When the amount of the second vinyl cyanide compound-conjugated diene compound-aromatic vinyl compound copolymer is too high, an automobile interior product prepared using a composite resin composition including the copolymer exhibits decreased fluidity.

That is, since the composite resin composition according to an embodiment of the present invention includes 10 to 14% by weight of the second vinyl cyanide compound-conjugated diene compound-aromatic vinyl compound copolymer that is prepared by polymerizing the compounds in a specific amount, an automobile interior product manufactured using the composite resin composition may exhibit balanced impact resistance, stiffness, heat resistance and chemical resistance.

The aromatic vinyl compound-vinyl cyanide compound copolymer according to an embodiment of the present invention may be a copolymer including 26% by weight or more of a vinyl cyanide compound and 74% by weight or less of an aromatic vinyl compound. Preferably, the aromatic vinyl compound-vinyl cyanide compound copolymer according to an embodiment of the present invention may be a copolymer including 26 to 29% by weight of a vinyl cyanide compound and 71 to 74% by weight of an aromatic vinyl compound. More preferably, the aromatic vinyl compound-vinyl cyanide compound copolymer according to an embodiment of the present invention may be a copolymer including 27 to 29% by weight of a vinyl cyanide compound and 71 to 73% by weight of an aromatic vinyl compound. More preferably, the aromatic vinyl compound-vinyl cyanide compound copolymer according to an embodiment of the present invention may be a copolymer including 28 to 29% by weight of a vinyl cyanide compound and 71 to 72% by weight of an aromatic vinyl compound. When the amount of the vinyl cyanide compound is below the ranges, the effect of reinforcing rigidity is insignificant. On the other hand, when the amount of the vinyl cyanide compound is too high, impact resistance is decreased.

The aromatic vinyl compound and vinyl cyanide compound included in the aromatic vinyl compound-vinyl cyanide compound copolymer may also be the same as the aromatic vinyl compound and vinyl cyanide compound included in the first vinyl cyanide compound-conjugated diene compound-aromatic vinyl compound copolymer described above.

The amount of the aromatic vinyl compound-vinyl cyanide compound copolymer may be 32 to 40% by weight, particularly 33 to 37% by weight, based on 100% by weight of a total of the composite resin composition (the polyester resin+the first vinyl cyanide compound-conjugated diene compound-aromatic vinyl compound copolymer+the second vinyl cyanide compound-conjugated diene compound-aromatic vinyl compound copolymer+the aromatic vinyl compound-vinyl cyanide compound copolymer). When the amount of the aromatic vinyl compound-vinyl cyanide compound copolymer is too low, an automobile interior product prepared using a composite resin composition including the aromatic vinyl compound-vinyl cyanide compound copolymer exhibits a decreased flexural modulus. On the other hand, when the amount of the aromatic vinyl compound-vinyl cyanide compound copolymer is too high, an automobile interior product prepared using a composite resin composition including the copolymer exhibits decreased heat resistance.

That is, since the composite resin composition according to an embodiment of the present invention includes 30 to 38% by weight of the aromatic vinyl compound-vinyl cyanide compound copolymer prepared by polymerizing the compounds in a specific amount range, an automobile interior product manufactured using the composite resin composition exhibits balanced impact resistance, stiffness, heat resistance and chemical resistance.

The weight average molecular weight of the aromatic vinyl compound-vinyl cyanide compound copolymer may be preferably 130,000 to 180,000 g/mol, more preferably 130,000 to 160,000 g/mol, more preferably 130,000 to 150,000 g/mol. Within these ranges, heat resistance and the like are excellent.

In the present disclosure, unless otherwise defined, the weight average molecular weight may be measured using gel permeation chromatography (GPC, Water Breeze). As a specific example, the weight average molecular weight may be measured using tetrahydrofuran (THF) as an eluate through gel permeation chromatography (GPC, Water Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MinMix-B (250×4.6 mm)+1×PLgel 10 μm MinMix-B (250×4.6 mm)+1×PLgel 10 μm MinMix-B Guard (550×4.6 mm), equipment name: Agilent 1200 series system, refractive index detector: Agilent G1362 RID, RI temperature: 35° C., data processing: Agilent ChemStation S/W, and test method (Mn, Mw, PDI): OECD TG 118.

To improve the flowability of the composite resin composition according to an embodiment of the present invention, to prevent decomposition thereof by high temperature or light, and to supplement chemical resistance, an appropriate additive may be further included.

Specifically, one or more additives selected from a lubricant, a heat stabilizer, and a UV absorber may be further included.

The lubricant is not specifically limited so long as it can ensure ease of extraction and flowability of an injection screw used for manufacturing an automobile interior product using a composite resin composition including the lubricant. Preferably, the lubricant may include ethylene bis stearamide, polyethylene wax or a combination thereof The amount of the lubricant may be 0.01 to 10 parts by weight, particularly 0.1 to 3 parts by weight, 100 parts by weight of the composite resin. When the amount of the lubricant is too high, appearance problems such as stains may be generated on the surface of an automobile interior product prepared using a composite resin composition including the lubricant so that appearance may be worsened.

The heat stabilizer is not specifically limited so long as an automobile interior product prepared using a composite resin composition including the heat stabilizer can be prevented from being deformed due to high temperature. Preferably, the heat stabilizer may be a phenolic antioxidant The phenolic antioxidant may further include a hindered phenol-based stabilizer having crystallization temperature (Tm) of 110 to 130° C. As a particular example, the phenolic antioxidant may include tetrakise[ethylene-3-(3,5-di-t-butyl-hydroxyphenyl)propionate], octadecyl 3-(3,5-di-t-butyl-4-hydroxyphenyl)propionate or a combination thereof.

The amount of the heat stabilizer may be 0.01 to 10 parts by weight, particularly 0.1 to 5 parts by weight, based on 100 parts by weight of the composite resin. Then the amount of the heat stabilizer is too high, appearance problems such as stains may occur on the surface of an automobile interior product prepared using a composite resin composition including so that appearance may be decreased.

The UV absorber is not specifically limited so long as an automobile interior product prepared using a composite resin composition including the UV absorber can be prevented from being deformed by light. Preferably, the UV absorber may be a benzotriazole-based compound, a triazine-based compound, or the like.

The triazine-based compound may be one or more selected from the group consisting of, for example, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-butoxyphenyl)-1,3,5-triazine, 2,6-diphenyl-4-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-benzyloxyphenyl)-1,3,5-triazine, 2,4,6-tris (2-hydroxy-4-octyloxyphenyl)-1,3,5-triazine, 2,4,6-tris (2-hydroxy-4-benzyloxyphenyl)-1,3,5-triazine, 2,4,6-tris (2-hydroxy-4-ethoxyethoxyphenyl)-1,3,5-triazine, 2,4,6-tris (2-hydroxy-4-butoxyethoxyphenyl)-1,3,5-triazine, 2,4,6-tris (2-hydroxy-4-methoxycarbonylpropyloxyphenyl)-1,3,5-triazine, 2,4,6-tris (2-hydroxy-3-methyl-4-ethoxyphenyl)-1,3,5-triazine, 2,4,6-tris (2-hydroxy-3-methyl-4-hexyloxyphenyl)-1,3,5-triazine, 2,4,6-tris (2-hydroxy-3-methyl-4-ethoxyethoxyphenyl)-1,3,5-triazine, 2,4,6-tris (2-hydroxy-3-methyl-4-ethoxycarbonylethyloxyphenyl)-1,3,5-triazine, 2,4-bis (2,4-dimethylphenyl)-6-(2-hydroxy-4-N-octyloxyphenyl)-1,3,5-triazine and 2-(4,6-diphenyl-1,3,5-triazine-2-yl)-5-(2-(2-ethylhexanoyloxy)ethoxy)phenol.

The benzotriazole-based compound may be one or more selected from among, for example, 2,4-di-t-butyl-6-(5-chlorobenzotriazole-2-yl) phenol, 2-(2'-hydroxy-5'-oxyphenyl)-benzotriazole, 2-(2'-hydroxymethylphenyl)benzotriazole, 2-(2'-hydroxy-3',5'-bis (α,α-dimethylbenzylphenyl)benzotriazole, 2-(2'-hydroxy-3',5'-dibutylphenyl)benzotriazole, 2-(2'-hydroxy-3'-tert-butyl-5'-methylphenyl)-5-chlorobenzotriazole, 2-(2'-hydroxy-3',5'-di-tert-amyl)benzotriazole, 2,2'-methylene bis[4-(1,1,3,3-tetramethylbutyl)-6-(2-N-benzotriazole-2-yl)phenol', 2-(4,6-diphenyl-1,3,5-triazine-2-yl)-5-hexyloxyl-phenol and 2-(2H-benzotriazole-2-yl)-4,6-bis (1-methyl-1-phenylethyl) phenol.

To improve light resistance while improving heat resistance under high load, the composite resin of the present disclosure may include one or more selected from the group consisting of a triazine compound having a weight average molecular weight of 400 g/mol or more and a benzotriazole-based compound having a weight average molecular weight of 400 g/mol or more.

As a particular example, the composite resin of the present disclosure may include one or more selected from the group consisting of a triazine compound that can absorb ultraviolet light having a wavelength of 300 to 400 nm and has a weight average molecular weight of 400 to 600 g/mol or 400 to 500 g/mol; and a benzotriazole-based compound that can absorb ultraviolet light having a wavelength of 270 to 350 nm and has a weight average molecular weight of 400 to 600 g/mol or 400 to 500 g/mol. In this case, the physical property balance is excellent and light resistance is further improved.

The amount of the UV absorber may be 0.01 to 5 parts by weight, particularly 0.05 to 3 parts by weight, based on 100 parts by weight of the composite resin. Within these ranges, the physical property balance is excellent and light resistance is further improved.

The amount of the UV absorber may be 0.01 to 5 parts by weight, particularly 0.05 to 3 parts by weight, based on 100 parts by weight of the composite resin. Within these ranges, the physical property balance is excellent and light resistance is further improved.

The amount of the sum of the aforementioned lubricant, heat stabilizer, and UV absorber may be particularly 0.1 to 5 parts by weight, preferably 1 to 3 parts by weight, based on 100 parts by weight of the polyester resin. In this case, the optimal balance between heat resistance and light resistance may be maintained.

A light resistance characteristic deviation (AE), which is represented by Equation 1 below, of the composite resin composition of the present disclosure may be 2.0 or less, particularly 1.0 or less, preferably 0.1 to 0.5. In this case, the optimal balance between heat resistance and light resistance may be maintained.

Light resistance characteristic deviation=(Gloss degree of glossy specimen−gloss degree of embossed specimen) [Equation 1]

(In the equation, the gloss degree is measured under conditions of a temperature of 89±3° C., a relative humidity of 50±5%, an irradiation dose of 84 $MJ/m^2$, and an irradiance of 0.55±0.02 $W/m^2$·nm (300 to 400 nm) according to MS210-05, and the glossy specimen is prepared at an injection temperature of 230 to 250° C. and a mold temperature of 50° C. using a mold that had been mirror surface-finished at 2,000 to 40,000 grit, and the embossed specimen was prepared in the same manner as the above specimen except for using a mold having an embossed pattern having a size of 15 to 21 μm formed on the surface thereof.)

Unless otherwise specified, the gloss degree may refer to a color difference change (ΔE) obtained according to Equation 2 below after measuring the color of each of the glossy specimen and the embossed specimen.

$$\Delta E = \sqrt{\{(L-L')^2 + (a-a')^2 + (b-b')^2\}} \quad \text{[Equation 2]}$$

To obtain the light resistance characteristic deviation, the gloss degree is measured according to specular component include (SCI) including specular light according to MS210-05. This SCI evaluation method is distinguished from an evaluation method, close to the naked eye, reflecting the SCE described below in that the SCI evaluation method evaluates the color of a material itself regardless of a surface state.

Method of Preparing Composite Resin Composition

Hereinafter, a method of preparing the composite resin composition of the present invention is described. In describing the method of preparing the composite resin composition of the present invention, all of the above particulars regarding the composite resin composition are included.

The method of preparing the composite resin composition of the present disclosure includes, for example, a step of feeding 15 to 20% by weight of a first vinyl cyanide compound-conjugated diene compound-aromatic vinyl compound copolymer; 9 to 15% by weight of a second vinyl cyanide compound-conjugated diene compound-aromatic vinyl compound copolymer; 32 to 40% by weight of an aromatic vinyl compound-vinyl cyanide compound copolymer; and 29 to 37% by weight of a polyester resin into an extruder and melt-kneading and extruding the same, wherein the amount (%) of the aromatic vinyl compound included in the first vinyl cyanide compound-conjugated diene compound-aromatic vinyl compound copolymer is smaller than the amount (%) of the aromatic vinyl compound included in the second vinyl cyanide compound-conjugated diene compound-aromatic vinyl compound copolymer.

As a particular example, the method of preparing the composite resin composition of the present disclosure includes a step of feeding 15 to 20% by weight of a first vinyl cyanide compound-conjugated diene compound-aromatic vinyl compound copolymer; 9 to 15% by weight of a second vinyl cyanide compound-conjugated diene compound-aromatic vinyl compound copolymer; 32 to 40% by weight of an aromatic vinyl compound-vinyl cyanide compound copolymer; and 29 to 37% by weight of a polyester resin into an extruder and melt-kneading and extruding the same, wherein the amount of the aromatic vinyl compound included in the first vinyl cyanide compound-conjugated diene compound-aromatic vinyl compound copolymer is smaller than the amount of the aromatic vinyl compound included in the second vinyl cyanide compound-conjugated diene compound-aromatic vinyl compound copolymer, the amount of the vinyl cyanide compound included in the aromatic vinyl compound-vinyl cyanide compound copolymer is 27 to 29% by weight based on a total weight of the copolymer, and the polyester resin has an intrinsic viscosity of 1.05 dl/g or more.

In the melt-kneading step, for example, the aforementioned other additives may be included.

The melt-kneading and extruding step may be performed, for example, using one or more selected from a group consisting of a single-screw extruder, a twin-screw extruder, and a Banbury mixer, preferably using a twin-screw extruder. The melt-kneading and extruding step may be performed by uniformly mixing components using the extruder, and then conducting extrusion to obtain a composite resin composition in a pellet form. In this case, mechanical property deterioration and thermal property decrease are prevented and excellent plating adhesion and appearance are provided.

The step of preparing pellets using an extrusion kneader may be performed, for example, under conditions of an extrusion temperature of 210 to 280° C., an extrusion rate of 30 to 90 kg/hr, and a screw rotation number of 200 to 350 rpm, preferably under conditions of an extrusion temperature of 210 to 250° C., an extrusion rate of 30 to 70 kg/hr, and a screw rotation number of 200 to 300 rpm.

The pellets produced after extruding the composite resin composition may be dried in a convection oven at 60 to 90° C. for 4 hours or more, followed by injection molding.

The injection molding may include a step of injection-molding under conditions of an injection temperature of 240 to 280° C., particularly 240 to 260° C., a mold temperature of 40 to 80° C., particularly 50 to 70° C., and an injection rate of 10 to 50 mm/sec, particularly 20 to 40 mm/sec, using an injection molding machine (ENGEL, 80 tons).

Further, an automobile interior product including the composite resin composition of the present invention is described. In describing an automobile interior product including the composite resin composition of the present invention, all of the above particulars regarding the composite resin composition are included.

Automobile Interior Product

Since the composite resin composition of the present invention is sufficiently optimized due to use of the above components, the composite resin composition may be used for an automobile interior product requiring moldability, mechanical properties, heat resistance under low load, heat resistance under high load, and chemical resistance.

The automobile interior product may be manufactured by a method generally used in the art. For example, using a melted kneaded material or pellets of the composite resin composition according to the present invention or a sheet (a plate) molded using the melted kneaded material or pellets as a low material, an injection molding method, an injection compression molding method, an extrusion molding method, a sheet casting method, a press molding method, a pressure forming method, a heat bending method, a compression molding method, a calender molding method, a rotating molding method, or the like may be applied.

The composite resin composition of the present disclosure including the first vinyl cyanide compound-conjugated diene compound-aromatic vinyl compound copolymer, the second vinyl cyanide compound-conjugated diene compound-aromatic vinyl compound copolymer, the aromatic vinyl compound-vinyl cyanide compound copolymer, the polyester resin, and additives is fed, for example, in a supply rate of 50 kg/h into a main inlet of a twin-screw extruder (φ40, L/D: 42, SM Platek equipment) set to 250° C. and 250 rpm, followed by melt-kneading and extruding, resulting in pellet production.

The pellets are fed into an injection molding machine to prepare an automobile interior product.

To indirectly confirm the physical properties of the automobile interior product, the pellets are injected at an injection temperature of 250° C., a mold temperature of 60° C., and an injection rate of 30 mm/sec using an injection molding machine (ENGEL, 80 tons), thereby manufacturing a specimen according to ISO standards.

The flow index (melt flow rate), measured at 250° C. under a load of 5 kg according to ISO 1133, of the manufactured specimen may be, for example, 25 g/10 min or more, particularly, 25 to 27 g/10 min.

In addition, the Izod notch impact strength, measured at 23° C. according to ISO 180/1A, of the specimen may be, for example, 14 kJ/m2 or more, particularly 14 to 15 kJ/m2.

In addition, the tensile strength, measured at a speed of 5 mm/min according to ISO 527, of the specimen may be, for example, 49 MPa or more, particularly 53 to 60 MPa.

In addition, the flexural strength, which is measured at a speed of 2 mm/min using SPAN 64 according to ISO 178, of a ⅛ inch specimen may be, for example, 61 MPa or more, particularly 63 to 64 MPa, and a flexural modulus of which may be 1950 MPa or more, particularly 2000 to 2070 MPa.

In addition, the high-load heat deflection temperature (HDT), measured under a load of 1.82 MPa according to ISO 75, of the specimen may be 75° C. or more, particularly 76 to 77° C.

In addition, the low-load heat deflection temperature (HDT), measured under a load of 0.45 MPa according to ISO 75, of the specimen may be 93° C. or more, particularly 95 to 96° C.

In addition, the density, measured according to ISO 1183, of the specimen may be 1.10 g/cm$^3$ or more, particularly 1.10 to 1.12 g/cm$^3$.

In addition, the specimen has an L* value of 16.22 or less, particularly 11.00 to 13.77, measured with a specular component exclude (SCE) reflection LAB colorimeter which is an evaluation method close to the naked eye by removing specular light and measuring only diffuse light according to ISO 7724. Here, as the L* value is closer to 0, it is closer to black color and the degree of gas generation during injection is reduced, which indicates that the appearance is excellent.

In addition, when a specimen having a size (length: 165 mm, width: 19 mm, thickness: 3.2 mm) identical to that of a tensile strength measurement specimen according to ASTM D638 is fixed to a jig having a stress of 2.0% according to an environmental stress cracking (ESC) test according to ISO 4599, 25 μl of a mixed solution containing isoamyl acetate, limonene, and linalool in a volume ratio of 4:1:1 is applied onto the specimen using a micropipette, and then, after 2 hours, occurrence of crazes or cracks is observed, the specimen has no crazes or cracks. This indicates that the specimen has excellent chemical resistance.

The specimen may have a value of −0.25 to −0.55 and a b value of −3.52 to −4.03, measured with an SCE reflection LAB colorimeter which is an evaluation method close to the naked eye by removing specular light and measuring only diffuse light according to ISO 7724.

The automobile interior product may be particularly a floor console front tray or a cup holder, without being limited to a specific type.

That is, the composite resin composition according to an embodiment of the present invention includes a polyester resin, a predetermined emulsion-polymerized copolymer, an bulk-polymerized copolymer and a thermoplastic copolymer, and thus, an automobile interior product manufactured using the composition exhibits improved heat resistance and chemical resistance, unlike existing automobile interior products, thereby satisfying the balance between physical properties such as mechanical properties, fluidity, and light resistance and providing excellent product reliability and appearance.

In describing the composite resin composition of the present invention, the method of preparing the same, and an automobile interior product including the composite resin composition, other conditions or equipment not expressly described may be appropriately selected within a range commonly practiced in the art, and there is no particular limitation.

Hereinafter, embodiments of the present invention will be described in detail so that those of ordinary skill in the art can easily carry out the present invention. However, the present invention may be embodied in various different forms and is not limited to the embodiments described herein.

EXAMPLES

Examples 1 to 5, Comparative Examples 1 to 9, Reference Examples 1 and 2: Preparation of Composite Resin Compositions The following raw materials were used in Example.

A-1) Polybutylene terephthalate: Intrinsic viscosity (IV): 1.0

A-2) Polybutylene terephthalate: Intrinsic viscosity (IV): 1.2

B) Emulsion-polymerized diene rubber-styrene-acrylonitrile (butadiene 60 wt %, styrene 30 wt %, acrylonitrile 10 wt %)

C) Bulk-polymerized diene rubber-styrene-acrylonitrile (butadiene 11 wt %, styrene 62 wt %, acrylonitrile 27 wt %)

D-1) Styrene-acrylonitrile (styrene 72 wt %, acrylonitrile 28 wt %, weight average molecular weight 133,000 g/mol)

D-2) Styrene-acrylonitrile (styrene 76 wt %, acrylonitrile 24 wt %, weight average molecular weight 121,000 g/mol)

E) Amide lubricant

F) Heat stabilizer (high phenolic antioxidant)

G) Benzotriazole-based compound (weight average molecular weight: 448 g/mol)

Raw materials of summarized in Table 1 below were mixed to prepare a composite resin composition, and then the composite resin composition having uniform dispersion was manufactured in the form of pellets through extrusion. Next, the pellets were heated and injected into a mold, followed by cooling. The cooled pellets were manufactured into a specimen to be used as an automobile interior product in an injection process of producing components.

Specifically, components summarized in Table 1 below were mixed by means of a mixer, and then fed into a main inlet of a twin-screw extruder (φ40, L/D: 42, barrel temperature: 230° C., extrusion rate: 50 kg/hr, screw rotation number: 250 rpm, SM Platek equipment) set to 230° C. to extrude for 1 to 3 minutes, thereby manufacturing composite resin composition pellets.

The produced pellets were dried in a 80° C. convection oven for 4 hours or more, and then were injected under conditions of an injection temperature of 260° C., a mold temperature of 60° C., and an injection rate of 30 mm/sec using an injection molding machine (ENGEL, 80 tons), thereby manufacturing an ISO specimen.

TABLE 1

| Classification | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| A-1) | — | — | — | — | — | — | — | — | — |
| A-2) | 33 | 37 | 30 | 31 | 32 | 28 | 33 | 33 | 33 |
| B) | 18 | 18 | 19 | 19 | 19 | — | 14 | 22 | 26 |
| C) | 12 | 12 | 11 | 11 | 11 | 30 | 16 | 8 | 4 |
| D-1) | 36 | 32 | 39 | 38 | 37 | 41 | 36 | 36 | 36 |
| D-2) | — | — | — | — | — | — | — | — | — |
| E) | 0.3 | 0.3 | 0.3 | 0.3 | 0.3 | 0.3 | 0.3 | 0.3 | 0.3 |
| F) | 0.4 | 0.4 | 0.4 | 0.4 | 0.4 | 0.4 | 0.4 | 0.4 | 0.4 |
| G) | 0.3 | 0.3 | 0.3 | 0.3 | 0.3 | 0.3 | 0.3 | 0.3 | 0.3 |

| Classification | Comparative Example 5 | Comparative Example 6 | Comparative Example 7 | Comparative Example 8 | Comparative Example 9 | Reference Example 1 | Reference Example 2 |
|---|---|---|---|---|---|---|---|
| A-1) | — | — | — | — | — | 33 | — |
| A-2) | 33 | 38 | 31 | 45 | 55 | — | 33 |
| B) | 30 | 22 | 15 | 18 | 12 | 18 | 18 |
| C) | — | 12 | 12 | 12 | 12 | 12 | 12 |
| D-1) | 36 | 28 | 41 | 24 | 20 | 36 | — |
| D-2) | — | — | — | — | — | — | 36 |
| E) | 0.3 | 0.3 | 0.3 | 0.3 | 0.3 | 0.3 | 0.3 |
| F) | 0.4 | 0.4 | 0.4 | 0.4 | 0.4 | 0.4 | 0.4 |
| G) | 0.3 | 0.3 | 0.3 | 0.3 | 0.3 | 0.3 | 0.3 |

For reference, the total weight oof the raw materials A-1 to G summarized in Table 1 is 100 by weight.

Experimental Example: Physical Property Evaluation of Automobile Interior Product Specimen The automobile interior product specimens manufactured according to Examples 1 to 5, Comparative Examples 1 to 9, and Reference Examples 1 and 2 were subjected to physical property evaluation. The evaluation criteria are as follows.

Fluidity (Melt Flow Rate): Implemented according to ISO 1133 (250° C., 5 kg)

Impact strength (IZOD): Implemented according to ISO 180/1A (Notched, 23° C.)

Tensile strength: Implemented according to ISO 527 (50 mm/min)

Flexural strength, flexural modulus: Implemented according to ISO 178 (⅛ inch, SPAN 64, speed: 2 mm/min)

Heat deformation temperature: Implemented according to ISO 75 (high load: 1.82 MPa, low load: 0.45 MPa)

Density: Measured according to ISO 1183

Chemical resistance: Environmental Stress Cracking (ESC), a specimen having a size (length: 165 mm, width: 19 mm, thickness: 3.2 mm) identical to that of a tensile strength measurement specimen according to ASTM D638 was fixed to a jig having a stress of 2.0% according to ISO 4599, 25 μl of a fragrance (a mixed solution containing isoamyl acetate, limonene, and linalool in a volume ratio of 4:1:1) was applied onto the specimen using a micropipette, and then, after 2 hours, occurrence of crazes or cracks was observed with the naked eye. When no crazes or cracks occurred, it was marked as "Normal". When crazes or cracks occurred, it was marked as "Crack".

Light resistance characteristic deviation (AE): A light resistance characteristic deviation between a glossy specimen and an embossed specimen was obtained by Equation 1 below under conditions of a temperature of 89±3° C., a relative humidity of 50±5%, an irradiation amount of 84 $MJ/m^2$ and an irradiance of 0.55±0.02 $W/m^2\cdot nm$ (300~400 nm) using specular component include (SCI) (includes specular light and thus evaluates the color of a material itself regardless of a surface state) according to MS210-05. When the calculated value exceeds 2.0, it was determined that light resistance was poor.

Light resistance characteristic deviation=(Gloss degree of glossy specimen−gloss degree of embossed specimen) [Equation 1]

Here, the glossy specimen was manufactured under conditions of an injection temperature of 230~250° C. and a mold temperature of 50° C. using a mold mirror-treated with 2,000 to 40,000 grit, and the embossed specimen was manufactured in the same manner as in the glossy specimen using a mold for forming an embossed shape having a size of 15 to 21 μm on the surface of a specimen.

In addition, the color of each of the glossy specimen and the embossed specimen was measured using a Hunter Lab color meter, and a color difference change (AE) of the each specimen was obtained by Equation 2 below.

$$\Delta E=\sqrt{\{(L-L')^2+(a-a')^2+(b-b')^2\}} \quad \text{[Equation 2]}$$

Lab colorimetric test: An L value, a value, and b value of a specimen were measured using specular component exclude (SCE) (which is an evaluation method close to the naked eye by removing specular light and measuring only diffuse light) according to ISO 7724. As the L* value is closer to 0, it is closer to black color and the degree of gas generation during injection is reduced, which indicates that the appearance is excellent.

Results measured according to the evaluation criteria are summarized in Table 2 below.

TABLE 2

| Classification | | Example 1 | Example 2 | Example 3 | Example 4 | Example 5 | Comparative Example 1 |
|---|---|---|---|---|---|---|---|
| Fluidity (g/10 min) | | 25 | 27 | 25 | 26 | 26 | 35 |
| Impact strength (kJ/m$^2$) | | 14 | 15 | 11 | 11 | 12 | 6 |
| Tensile strength (MPa) | | 44 | 43 | 44 | 44 | 43 | 59 |
| Flexural strength (MPa) | | 64 | 63 | 63 | 63 | 62 | 82 |
| Flexural modulus (MPa) | | 2070 | 2000 | 1960 | 1945 | 1915 | 2500 |
| Heat deflection temperature | Lowload (° C.) | 96 | 95 | 94 | 94 | 94 | 99 |
| | Highload (° C.) | 76 | 77 | 76 | 76 | 78 | 81 |
| Density (g/cm$^3$) | | 1.12 | 1.12 | 1.11 | 1.11 | 1.11 | 1.10 |
| Chemical resistance | | Normal | Normal | Normal | Normal | Normal | Normal |
| Light resistance (SCI) | Glossy specimen | 1.1 | 1.1 | 1.1 | 1.1 | 1.1 | 1.1 |
| | Embossed specimen | 1.0 | 1.0 | 1.0 | 1.0 | 1.0 | 1.0 |
| Lab colorimetric test (SCE) | L* | 13.77 | 11.00 | 11.50 | 12.24 | 10.84 | 9.02 |
| | a* | −0.55 | −0.25 | −0.50 | −0.33 | −0.24 | −0.39 |
| | b* | −4.03 | −3.52 | −3.52 | −3.81 | −3.67 | −3.16 |

| Classification | | Comparative Example 2 | Comparative Example 3 | Comparative Example 4 | Comparative Example 5 | Comparative Example 6 | Comparative Example 7 |
|---|---|---|---|---|---|---|---|
| Fluidity (g/10 min) | | 31 | 22 | 18 | 12 | 24 | 28 |
| Impact strength (kJ/m$^2$) | | 10 | 33 | 39 | 43 | 34 | 43 |
| Tensile strength (MPa) | | 47 | 42 | 40 | 39 | 41 | 40 |
| Flexural strength (MPa) | | 68 | 61 | 59 | 74 | 60 | 58 |
| Flexural modulus (MPa) | | 2170 | 1970 | 1850 | 1735 | 1890 | 1820 |
| Heat deflection temperature | Lowload (° C.) | 94 | 96 | 91 | 103 | 96 | 93 |
| | Highload (° C.) | 76 | 77 | 74 | 83 | 76 | 73 |
| Density (g/cm$^3$) | | 1.12 | 1.11 | 1.11 | 1.10 | 1.10 | 1.11 |
| Chemical resistance | | Normal | Normal | Normal | Normal | Normal | Normal |
| Light resistance (SCI) | Glossy specimen | 1.1 | 1.1 | 1.1 | 1.1 | 1.1 | 1.1 |
| | Embossed specimen | 1.0 | 1.0 | 1.0 | 1.0 | 1.0 | 0.9 |
| Lab colorimetric test (SCE) | L* | 11.39 | 11.67 | 12.58 | 15.22 | 9.94 | 13.77 |
| | a* | −0.33 | −0.26 | −0.26 | −0.39 | −0.14 | −0.55 |
| | b* | −3.50 | −3.22 | −3.82 | −3.71 | −3.22 | 3.93 |

| Classification | | Comparative Example 8 | Comparative Example 9 | Reference Example 1 | Reference Example 2 |
|---|---|---|---|---|---|
| Fluidity (g/10 min) | | 30 | 34 | 28 | 27 |
| Impact strength (kJ/m$^2$) | | 20 | 15 | 10 | 11 |
| Tensile strength (MPa) | | 32 | 35 | 43 | 43 |
| Flexural strength (MPa) | | 47 | 53 | 62 | 62 |
| Flexural modulus (MPa) | | 1355 | 1485 | 1910 | 1980 |
| Heat deflection temperature | Lowload (° C.) | 89 | 102 | 86 | 93 |
| | Highload (° C.) | 70 | 85 | 69 | 74 |
| Density (g/cm$^3$) | | 1.12 | 1.15 | 1.11 | 1.12 |
| Chemical resistance | | Normal | Normal | Normal | Normal |
| Light resistance (SCI) | Glossy specimen | 1.1 | 1.1 | 1.1 | 1.1 |
| | Embossed specimen | 0.9 | 1.0 | 0.9 | 1.0 |
| Lab colorimetric test (SCE) | L* | 14.27 | 11.46 | 14.94 | 13.77 |
| | a* | −0.55 | −0.27 | −0.55 | −0.55 |
| | b* | −3.97 | −3.46 | −4.01 | −3.84 |

Referring to Table 2, it can be confirmed that the composite resin compositions of Examples 1 to 5 according to the present invention provide excellent impact strength, flexural modulus, high-load heat deflection temperature, and light resistance (light resistance characteristic deviation) while realizing a density within an appropriate range, so that automobile interior products manufactured using the composite resin compositions have excellent chemical resistance, high-load heat resistance and light resistance while basically satisfying physical properties such as impact strength, tensile strength and flexural strength and exhibit excellent product reliability and appearance due to low gas generation during injection.

On the other hand, it can be confirmed that in the case of Comparative Example 1 in which the first vinyl cyanide compound-conjugated diene compound-aromatic vinyl compound copolymer is not included and the remaining three components are used in excessive amounts, impact strength is significantly poor, compared to Examples 1 to 5.

In addition, it can be confirmed that in the case of Comparative Examples 2 to 3 in which the amount of each of the second vinyl cyanide compound-conjugated diene compound-aromatic vinyl compound copolymer and the vinyl cyanide compound-an aromatic vinyl compound is outside the ranges of the present invention, impact strength, a flow index, and the like are poor, compared to Examples 1 to 5.

In particular, it can be confirmed that in the case of Comparative Example 4 in which the second vinyl cyanide compound-conjugated diene compound-aromatic vinyl compound copolymer is used in a very small amount, a flow index is decreased and a flexural strength, a flexural modulus, and a heat deformation temperature under high load are poor, compared to Examples 1 to 5.

In addition, it can be confirmed that in the case of Comparative Example 5 in which the first vinyl cyanide compound-conjugated diene compound-aromatic vinyl compound copolymer is used in an amount exceeding the range of the present invention and the second vinyl cyanide compound-conjugated diene compound-aromatic vinyl compound copolymer is not used, a flow index and a flexural modulus are poor, compared to Examples 1 to 5.

In addition, it can be confirmed that in the case of Comparative Example 6 in which the first vinyl cyanide compound-conjugated diene compound-aromatic vinyl compound copolymer is used in an amount exceeding the range of the present invention, the aromatic vinyl compound-vinyl cyanide compound copolymer is used in an smaller amount than the range of the present invention, and the polyester resin is used in an excessive amount, all of a flow index, a flexural strength and a flexural modulus are poor, compared to Examples 1 to 5.

In addition, it can be confirmed that in the case of Comparative Example 7 in which the aromatic vinyl compound-vinyl cyanide compound copolymer is used in an amount exceeding the range of the present invention, a flexural strength, a flexural modulus, a heat deflection temperature under high load and chemical resistance are poor, compared to Examples 1 to 5.

In addition, it can be confirmed that in the case of Comparative Example 8 in which the polyester resin is used in an excessive amount and the aromatic vinyl compound-vinyl cyanide compound copolymer is used in a small amount, all of a flexural strength, a flexural modulus, a heat deformation temperature under low load and a heat deflection temperature under high load are poor, compared to Examples 1 to 5.

In addition, it can be confirmed that in the case of Comparative Example 9 in which the polyester resin is used in an amount exceeding the range of the present invention and the first vinyl cyanide compound-conjugated diene compound-aromatic vinyl compound copolymer and the aromatic vinyl compound-vinyl cyanide compound copolymer are used in an smaller amount than the range of the present invention, all of a flexural strength, a flexural modulus, a heat deformation temperature under low load and a heat deflection temperature under high load are poor, compared to Examples 1 to 5.

Further, it can be confirmed that in the case of Reference Example 1 in which a polyester resin having an intrinsic viscosity outside the range of the present invention is used, impact strength and flexural modulus are decreased, compared to Examples 1 to 5.

In addition, it can be confirmed that in the case of Reference Example 2 in which the amount of the vinyl cyanide compound included in the aromatic vinyl compound-vinyl cyanide compound copolymer is below the range of the present invention, impact strength is poor, compared to Examples 1 to 5.

That is, the composite resin composition according to an embodiment of the present invention includes the polyester resin and the emulsion-polymerized copolymer, bulk-polymerized copolymer and thermoplastic copolymer in which specific components are included in predetermined amounts, so that an automobile interior product manufactured using the composition exhibits improved heat resistance and chemical resistance, thereby satisfying the balance between physical properties such as mechanical properties, fluidity, and light resistance and providing excellent product reliability and appearance.

The invention claimed is:

1. A composite resin composition, comprising:

15 to 20% by weight of a first vinyl cyanide compound-conjugated diene compound-aromatic vinyl compound copolymer, based on 100% by weight of a total of the composite resin composition;

9 to 15% by weight of a second vinyl cyanide compound-conjugated diene compound-aromatic vinyl compound copolymer, based on 100% by weight of a total of the composite resin composition;

32 to 40% by weight of an aromatic vinyl compound-vinyl cyanide compound copolymer, based on 100% by weight of a total of the composite resin composition; and 29 to 37% by weight of a polyester resin, based on 100% by weight of a total of the composite resin composition, wherein an amount (%) of the aromatic vinyl compound comprised in the first vinyl cyanide compound-conjugated diene compound-aromatic vinyl compound copolymer is smaller than an amount (%) of the aromatic vinyl compound comprised in the second vinyl cyanide compound-conjugated diene compound-aromatic vinyl compound copolymer, wherein the intrinsic viscosity of the polyester resin is 1.1 to 1.3 dl/g, and wherein the vinyl cyanide compound comprised in the aromatic vinyl compound-vinyl cyanide compound copolymer is comprised in an amount of 26 to 29% by weight based on a total weight of the copolymer.

2. The composite resin composition according to claim 1, wherein a weight ratio of the second vinyl cyanide compound-conjugated diene compound-aromatic vinyl compound copolymer to the first vinyl cyanide compound-conjugated diene compound-aromatic vinyl compound copolymer is 1:1.37 to 1.66.

3. The composite resin composition according to claim 1, wherein the polyester resin is one or more selected from among polybutylene terephthalate (PBT), polyethylene adipate (PEA), polybutylene succinate (PBS), polyethylene terephthalate (PET), polytrimethylene terephthalate (PTT) and polyethylene naphthalate (PEN).

4. The composite resin composition according to claim 1, wherein the composite resin composition has an L* value of 14.00 or less that is obtained by measuring light, reflected by a specimen obtained in an SCE manner, using an LAB colorimetric system.

5. The composite resin composition according to claim 1, wherein the first vinyl cyanide compound-conjugated diene compound-aromatic vinyl compound copolymer comprises 40 to 80% by weight of a diene rubber polymer having an average particle size of 100 to 500 nm, 10 to 40% by weight of an aromatic vinyl compound and 1 to 20% by weight of a vinyl cyanide compound, based on 100% by weight of copolymer.

6. The composite resin composition according to claim 1, wherein the second vinyl cyanide compound-conjugated diene compound-aromatic vinyl compound copolymer comprises 5 to 20% by weight of a diene rubber polymer having an average particle size of 800 to 10,000 nm, 50 to 85% by weight of an aromatic vinyl compound and 10 to 30% by weight of a vinyl cyanide compound, based on 100% by weight of a total of the composite resin composition.

7. The composite resin composition according to claim 1, wherein the aromatic vinyl compound-vinyl cyanide compound copolymer comprises 71 to 72% by weight of an aromatic vinyl compound and 28 to 29% by weight of a vinyl cyanide compound, based on 100% by weight of a total of the composite resin composition, and has a weight average molecular weight of 130,000 to 180,000 g/mol.

8. The composite resin composition according to claim 1, wherein the composite resin composition has a flow index of 25 g/10 min or more that is measured at 250° C. under a load of 5 kg according to ISO 1133.

9. The composite resin composition according to claim 1, wherein the composite resin composition has an Izod impact strength of 14 $KJ/m^2$ or more that is measured at 23° C. according to ISO 180/1A.

10. The composite resin composition according to claim 1, wherein a ⅛ inch specimen manufactured using the composite resin composition has a flexural modulus of 1950 MPa or more that is measured at a speed of 2 mm/min according to ISO 178.

11. The composite resin composition according to claim 1, wherein the composite resin composition has a high-load heat resistance of 75° C. or more that is measured under 1.82 MPa according to ISO 75.

12. A method of preparing a composite resin composition, the method comprising:

feeding a mixture into an extruder, the mixture comprising:

15 to 20% by weight of a first vinyl cyanide compound-conjugated diene compound-aromatic vinyl compound copolymer, based on 100% by weight of a total of the composite resin composition;

9 to 15% by weight of a second vinyl cyanide compound-conjugated diene compound-aromatic vinyl compound copolymer, based on 100% by weight of a total of the composite resin composition; 32 to 40% by weight of an aromatic vinyl compound-vinyl cyanide compound copolymer, based on 100% by weight of a total of the composite resin composition; and 29 to 37% by weight of a polyester resin, based on 100% by weight of a total of the composite resin composition, and melt-kneading and extruding the mixture, wherein an amount (%) of the aromatic vinyl compound comprised in the first vinyl cyanide compound-conjugated diene compound-aromatic vinyl compound copolymer is smaller than an amount (%) of the aromatic vinyl compound comprised in the second vinyl cyanide compound-conjugated diene compound-aromatic vinyl compound copolymer, wherein the intrinsic viscosity of the polyester resin is 1.1 to 1.3 dl/g, and wherein the vinyl cyanide compound comprised in the aromatic vinyl compound-vinyl cyanide compound copolymer is comprised in an amount of 26 to 29% by weight based on a total weight of the copolymer.

13. An automobile interior product manufactured using the composite resin composition according to claim 1.

14. The automobile interior product according to claim 13, wherein the automobile interior product is a floor console front tray or a cup holder.

* * * * *